Sept. 17, 1940.　　　　J. H. WIGGINS　　　　2,215,308
CONTROL MECHANISM FOR GAS AND LIQUID STORAGE APPARATUS
Filed June 21, 1937　　　2 Sheets-Sheet 1
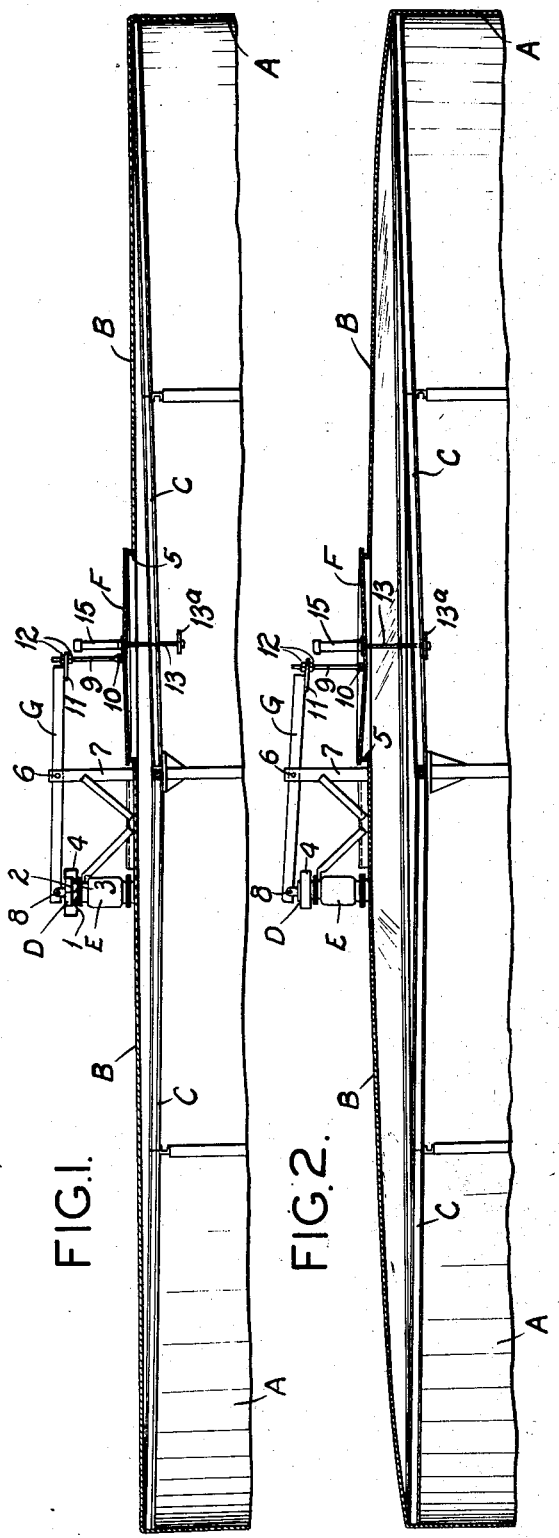
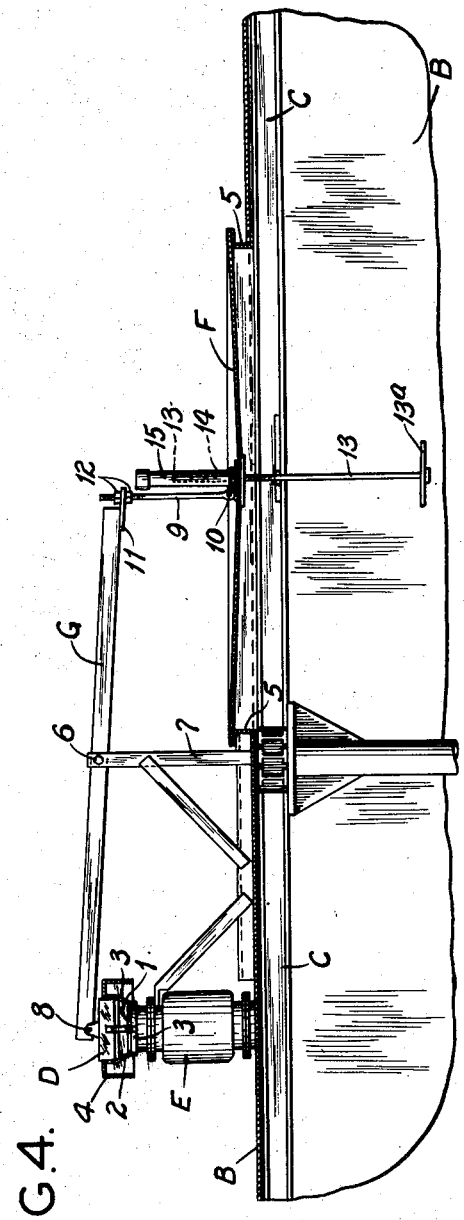
INVENTOR;
JOHN H. WIGGINS
BY Wells R. Church
ATTORNEY Sept. 17, 1940.   J. H. WIGGINS   2,215,308
CONTROL MECHANISM FOR GAS AND LIQUID STORAGE APPARATUS
Filed June 21, 1937   2 Sheets-Sheet 2

INVENTOR;
JOHN H. WIGGINS
BY Wells L. Church.
ATTORNEY

Patented Sept. 17, 1940

2,215,308

UNITED STATES PATENT OFFICE 2,215,308

CONTROL MECHANISM FOR GAS AND LIQUID STORAGE APPARATUS

John H. Wiggins, Chicago, Ill.

Application June 21, 1937, Serial No. 149,461

17 Claims. (Cl. 220—85)

This invention relates to gas and/or liquid storage devices of the kind that are equipped with a means for venting the gas space, either for the purpose of providing pressure relief or vacuum relief, or to provide both pressure relief and vacuum relief.

One object of my present invention is to provide a control mechanism for gas and/or liquid storage containers, that comprises a pressure relief valve, a means operated or actuated by positive internal pressure of the container for increasing the seating action of said valve, or for holding it shut tighter than it would be normally held without the influence or assistance of said modifying means, and an independent means for eliminating, destroying, or removing the effect produced on said valve by said modifying means at a predetermined approximately positive internal pressure of the container, whereby said valve may function to provide pressure relief for the container.

Another object is to provide a control mechanism of the kind above described, in which the means that enhances or increases the seating action of said valve when the container is under a positive pressure, also acts, under certain conditions, to cause said valve to open to provide vacuum relief for the container.

Another object is to provide a relief valve mechanism for containers, that comprises a pressure relief valve, and two diaphragms adapted to be operated by or influenced by the internal pressure of the container, and arranged so that one of said diaphragms is used to hold said valve closed and increase the seating action of said valve as the internal positive pressure of the container increases, and the other diaphragm is used to effect the opening or unseating of said valve when a certain approximate positive pressure is reached inside of the container.

Another object is to provide a valve mechanism of the kind just referred to, in which the diaphragm that is used to enhance or increase the seating action of the valve while the container is under a positive internal pressure, is also utilized to effect the opening of said valve to provide vacuum relief, in the event an approximate minus pressure is created in the container.

Another object is to provide a gas and/or liquid storage apparatus that comprises a breather type roof, or equivalent element, which is adapted to move in opposite directions so as to vary the volume of the gas space or vapor space of the apparatus, pressure relief valve and an operating mechanism for said valve, so constructed and arranged that the pressure in the gas space or vapor space is used in a novel way to hold the pressure relief valve tightly seated and the movement of the roof or equivalent element of the apparatus is used to effect the opening or unseating of said valve so as to provide pressure relief for the gas space.

Another object is to provide a storage apparatus of the general type mentioned, in which a prime mover carried by the roof or equivalent element of the apparatus is arranged in such a way that when said roof is in its extreme downwardly deflected condition, a certain approximate minus pressure or internal vacuum in the gas space causes said prime mover to move relatively to the roof, in a direction to unseat or open a vacuum relief valve.

And still another object of my invention is to provide a pressure relief and vacuum relief mechanism for storage apparatus of the general type mentioned, which is of such construction that it is unnecessary to provide the movable roof or equivalent element of the apparatus with a stuffing box or similar packing device for maintaining a gas-tight joint between the roof and a reciprocating part of the valve operating mechanism that passes through the roof.

Other objects and desirable features of my invention will be hereinafter pointed out.

To this end I have devised a control mechanism for containers, in which gases and/or liquids are stored, that comprises a pressure relief valve which is normally closed or seated, a means hereinafter referred to as a "prime mover" that is actuated or operated by positive internal pressure of the container for increasing the seating action of said valve, or in other words, for exerting additional pressure or auxiliary pressure on said valve in a direction tending to hold it more tightly shut or more tightly seated than would be the case if said prime mover were absent, and an independent means for eliminating or destroying the auxiliary or additional seating effect produced on the valve by said prime mover, when a certain approximate positive internal pressure is reached or created in the container. In addition to acting as an auxiliary or additional seating means for said valve when the container is under a positive internal pressure, said prime mover is also employed, under certain conditions, to unseat or open said valve to provide vacuum relief for the container. Preferably, said prime mover consists of a diaphragm adapted to be acted upon or influenced by pressure in the container, and arranged so that when the container is under a positive internal pressure, said diaphragm will exert pressure on the valve in a direction tending to force it tightly against its seat, and if a partial vacuum or minus pressure is thereafter created in the container, said diaphragm will flex in a direction to cause said valve to open, and thus admit air to the container to provide vacuum relief. The independent means previously mentioned, that is used to eliminate or destroy the auxiliary seating action exerted on the valve when the container is under a positive internal pressure, also preferably consists of a diaphragm, said second diaphragm being so constructed and arranged that when a certain approximate positive pressure is reached in the container, said second diaphragm will act in a way to result in the unseating or opening of said valve to provide pressure relief for the container.

I have herein illustrated my improved control mechanism in combination with an apparatus for storing gas and/or volatile liquids that comprises a container whose gas space or vapor space is equipped with a metal roof or equivalent element that is adapted to move in one direction (upwardly, in the case of a roof) so as to increase the volume of the gas space, and move in the opposite direction (downwardly, in the case of a roof) so as to reduce the volume of said gas space. Said roof constitutes the "second" diaphragm of my improved control mechanism, and the "first" diaphragm, previously mentioned is formed by a part hereinafter referred to as a "prime mover", carried by the roof and constructed and arranged so that it will be moved in one direction, relatively to the roof, by a positive pressure inside of the container, and will be moved in the reverse direction, relatively to the roof, by a minus pressure in the container. During the upward movement of the roof, a vent valve that is carried by the roof is held pressed tightly against its seat by pressure that is exerted on said valve by the action of the prime mover above mentioned, and when a certain approximately positive pressure is reached inside of the container, the seating action on said valve produced by the prime mover is destroyed, and said valve is caused to open so as to provide pressure relief for the container. As soon as the internal pressure of the container has been relieved, the prime mover again comes into action to exert a seating action on said valve which continues so long as the container is under a positive internal pressure. Subsequently, if a certain approximately minus pressure is created in the container, said prime mover will move relatively to the roof in a direction to open a vacuum relief vent and thus permit air or some other gas to enter the gas space or vapor space of the container. In the preferred form of my invention herein illustrated, a single valve is employed to permit gases to escape from the gas space so as to provide pressure relief and to permit air or the like to enter the gas space so as to provide vacuum relief, but I wish it to be understood that my broad idea contemplates the use of any suitable kind of venting means irrespective of whether said venting means comprises one or a plurality of valves. So also in the preferred form of my invention herein illustrated, the prime mover that forms part of the valve operating mechanism, is so arranged that when the container is under an internal pressure, the pressure in the gas space is exerted on said prime mover in a direction tending to cause the pressure relief vent valve to be held tightly seated, but I wish it to be understood that my broad idea is not limited to a prime mover having the dual characteristics above described.

In an apparatus of the construction above described, the prime mover constitutes, in effect, an auxiliary seating means for the valve that makes use of positive internal pressure of the container to enhance the seating action of the valve, or to hold said valve more tightly seated than would be the case if said prime mover were not employed. Prior to the time that a predetermined approximately positive pressure is reached in the container, said prime mover functions as an auxiliary seating or holding means for the valve, and when said predetermined approximately positive pressure is reached, an independent means comes into action, and in effect eliminates or destroys the auxiliary or additional seating action produced on the valve by said prime mover, whereupon said valve is free to open or perform its function of providing pressure relief for the container. Preferably, the independent means just mentioned, that destroys or eliminates the auxiliary valve seating action produced by the prime mover, consists of the roof and a part attached to or combined with the prime mover, and arranged so that when the roof is moving upwardly due to increase in pressure or expansion of the gases in the gas space, said part causes the prime mover to move in a direction to positively open the venting means when the roof reaches a certain approximate position during its upward movement, thereby venting the gas space and arresting further upward movement of the roof. As soon as the pressure of the gas space is relieved, the said prime mover returns to its former position in which it causes pressure to be exerted on the venting means in a direction tending to hold said venting means tightly seated. Subsequently, when the roof moves downwardly, due to a diminution of the pressure in the gas space, the prime mover holds the venting means tightly seated and it continues to function as a holding device or auxiliary seating device for the venting means so long as the container is under an internal pressure. When the pressure in the gas space decreases to a degree where a partial vacuum is set up in the gas space, the partial vacuum or minus pressure is exerted on the prime mover in a direction causing said device to coact with the venting means to admit air to the gas space so as to provide vacuum relief, and, after sufficient air has been admitted to the gas space to eliminate the possibility of a dangerous minus pressure developing therein, the said prime mover assumes such a position that the venting means is free to close due to the weight of same or to the action of an equivalent means employed to initially seat the venting means and prevent it from chattering.

In the embodiment of my invention herein illustrated, the part of the valve operating mechanism previously referred to as "the prime mover," consists of a metal diaphragm mounted on the roof in such a way that it is capable of flexing in opposite directions, and a lever is employed to transmit movement from said device to the vent valve. I wish it to be understood, however, that the particular form and arrangement of the part referred to as a prime mover is immaterial so far as my broad idea is concerned, and it is immaterial how said prime mover is combined with or coupled with the venting means of the apparatus so long as a vacuum relief vent valve will open when the prime mover moves in one direction relatively to the roof, due to a partial vacuum or minus pressure existing in the gas space. It is also immaterial, so far as my broad idea is concerned, how the removal or elimination of the auxiliary valve seating action of the prime mover and the unseating or opening of the venting means to provide pressure relief is effected, but one advantage or desirable characteristic of the valve operating mechanism herein illustrated is that it does not employ a reciprocating part that passes through a stuffing box or the like on the movable roof or equivalent element of the gas space. I have herein illustrated the storage apparatus as being equipped with a flame arrester that constitutes a passageway for gases, which are permitted to escape from the gas space, and for air, which is admitted to sai dgas space to provide vacuum relief but a flame arrester is not essential and may be omitted without departing from the spirit of my invention.

Figure 1 of the drawings is a vertical transverse sectional view of a storage apparatus constructed in accordance with my invention, showing the roof in a slightly raised position and with the prime mover of the valve operating mechanism flexed upwardly so as to hold the vent valve tightly seated, the said parts occupying such a position when the container is under an internal pressure.

Figure 2 is a view similar to Figure 1, showing the roof in its extreme upward position and the vent valve open so as to provide pressure relief.

Figure 3:
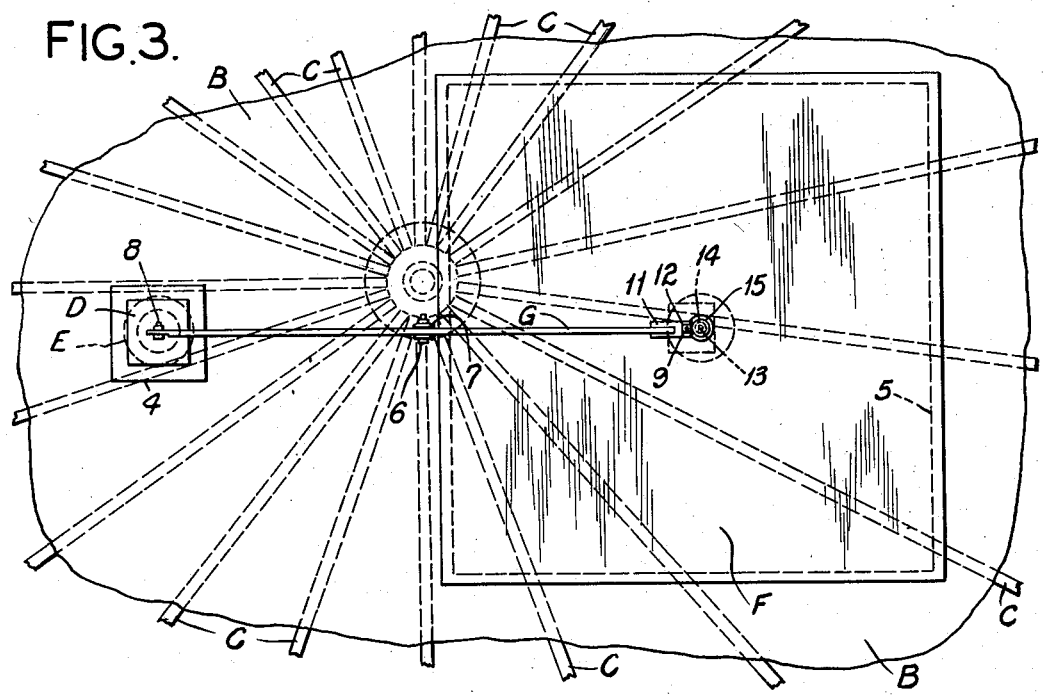
Figure 3 is a fragmentary top plan view of the apparatus.
Figure 5:
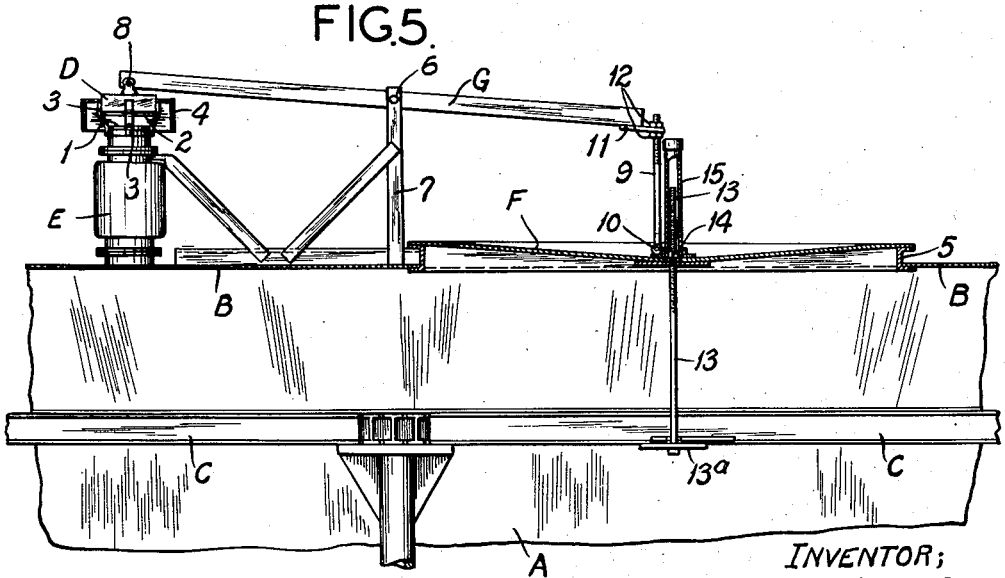

Figure 4 is a vertical transverse sectional view on an enlarged scale, showing the roof resting on its supporting rafters and with the prime mover pulled downwardly by a partial vacuum in the gas space, so as to open the vent valve to provide vacuum relief; and Figure 5 is a transverse sectional view on an enlarged scale, showing the roof in its extreme upward position and the vent valve held open to provide pressure relief.

Referring to the drawings, the reference character A designates the container which may be of any suitable or preferred construction, and the reference character B designates the roof of the container that forms the top wall of the gas space or vapor space, said roof preferably consisting of a metal diaphragm constructed and arranged so that it will rest upon and be supported by roof rafters C under certain conditions, and is capable of moving upwardly into the position shown in Figures 2 and 5, due to increase in the internal pressure of the container, as is common or usual in breather type and balloon type devices that are used for storing gases and volatile liquids.

The venting means for the gas or vapor space of the container A is herein illustrated as consisting of a vent valve D that controls an opening or passageway in the roof B through which gases are permitted to escape from the container to provide pressure relief and through which air is admitted to the container to provide vacuum relief. I have herein illustrated the vent valve D as being arranged at the upper end of a flame arrester E mounted on the roof A but, as previously stated, the flame arrester E may be omitted if desired. Preferably, the vent valve D consists of a relatively heavy valve element arranged horizontally above the valve seat 1 and provided on its under-side with a gasket 2 for maintaining a tight joint between the valve and its seat when the valve is in its closed position. Guides 3 are provided for the valve and a hood or cover 4 is also preferably provided for the valve D.

The valve operating mechanism comprises a prime mover F which in the form of my invention herein shown consists of a metal diaphragm which is elevated several inches above the roof B and pitched downwardly about one and one-half inches. As shown in the drawings, the metal diaphragm that constitutes the prime mover F is attached at its peripheral edge to a ring or support 5 that surrounds an opening formed in the roof B, thereby causing the device F to form part of the roof B but to be capable of flexing upwardly and downwardly relatively to said roof. Usually the diaphragm F will be about ten to twelve feet square. Under pressure the diaphragm or prime mover F will rise and, under vacuum, it will descend as hereinafter explained. The movements of the diaphragm F are exerted on the valve D by a means that causes said valve to open when the device F flexes in one direction and causes said valve to be forced more tightly against its seat when the device F flexes in the opposite direction. In the form of my invention herein illustrated, the means just referred to comprises a lever G pivotally connected at 6 to an upright 7 attached to the roof B adjacent the center of the roof, a pivotal connection 8 between one end of said lever and the valve D, and a rigid link 9 pivotally attached to the opposite end of said lever and pivotally connected at 10 to the central portion of the diaphragm F. In order that the position of the valve D relatively to the diaphragm F may be changed, the pivotal connection between the lever G and the link 9 is formed by a slotted plate 11 on the lever through which the upper end portion of the link 9 passes, said upper end portion being screw-threaded and provided with nuts 12 that lie above and beneath the slotted plate 11. By changing the position of the nuts 12 the distance between one end of the lever G and the central portion of the diaphragm F may be changed.

The means that is used to destroy, eliminate or overcome the additional or auxiliary seating action of the prime mover on the valve D, and also open said valve to provide pressure relief consists of a part 13 depending from the under-side of the central portion of the diaphragm F and arranged so that during the upward movement of the roof B a cross-piece or trip-block 13a on the part 13 coacts with one of the roof supporting beams C to flex the diaphragm F downwardly or move said diaphragm in a direction to cause the lever G to lift the valve D from its seat. The part 13 is herein illustrated as consisting of a rod having a screw-threaded portion projecting upwardly through the central portion of the diaphragm and screwed into a nut 14 that bears against the upper-side of the diaphragm. By adjusting the nut 14 on the rod 13, the position of the cross-piece 13a can be changed so as to vary the point in the upward movement of the roof B at which the valve D opens to permit gases to escape from the container. The opening in the diaphragm F through which the rod 13 projects upwardly is sealed or made gas-tight by means of a tube 15 telescoped over the upwardly projecting portion of the rod 13 and screwed onto a threaded part on the top side of the diaphragm F. The entire mechanism above described is preferably arranged at the center of the roof B so that there will be the least possibility of distortion of the entire mechanism.

The operation of the apparatus above described is as follows: As the roof B rises carrying with it the valve D and the operating mechanism for said valve, the increase in pressure on the interior of the container A will force the diaphragm or prime mover upwardly and thus tend to force the valve D more tightly against its seat. When the roof reaches a certain approximate position during its upward movement the stop-block or cross-piece 13a contacts one of the roof rafters C and thus arrests the upward movement of the rod 13, which depends from the diaphragm F. If the roof continues to move upwardly, then the diaphragm F, which is now in an upwardly flexed condition, will be pulled downwardly as shown in Figure 5, with the result that the lever G causes the valve D to open and vent the gas space, thereby providing pressure relief for the container. Now, as the roof descends, it will finally come to rest on the rafters C. As the pressure decreases and finally approaches zero, the valve E will remain closed due to the weight of said valve. When the pressure decreases further and a partial vacuum or minus pressure is set up in the gas space of the container, a downward force is exerted on the diaphragm F which causes said diaphragm to flex downwardly and thus move the lever G in a direction to open the valve D and permit air to enter the vapor space so as to provide vacuum relief for the container.

An apparatus of the construction above described, in addition to being of extremely simple design and absolutely reliable in operation, has the added advantage of making it unnecessary to equip the roof B with a stuffing box or similar packing device for a part of the valve operating mechanism that reciprocates through a hole in the roof B.

Having thus described my invention, what I claim as new and desire to secure by Letters Patent is:

1. A storage apparatus of the general type described, comprising a container having a part that is adapted to move in opposite directions so as to vary the volume of the gas space or vapor space, a combined pressure relief and vacuum relief valve for said container, and an operating mechanism for said valve, comprising a prime mover carried by the said movable part of the container and arranged so that pressure in the gas space moves said prime mover in one direction to hold said valve seated when the container is under an internal pressure and a minus pressure or partial vacuum in the gas space causes said prime mover to move in a direction to open said valve so as to provide vacuum relief.

2. An apparatus of the kind described in claim 1, provided with means for utilizing the movement of the movable part of the apparatus in one direction to vent the gas space to provide pressure relief.

3. A gas and/or liquid storage apparatus, comprising a container provided with a roof that is adapted to move in opposite directions so as to vary the volume of the gas space, a combined pressure relief and vacuum relief valve carried by the roof, means operated by the upward movement of the roof to open said valve when the container is under an internal pressure, and means for opening said valve to provide vacuum relief, comprising a prime mover carried by the roof and arranged so that an internal vacuum in the container causes said prime mover to move relatively to the roof.

4. A gas and/or liquid storage apparatus, comprising a container provided with a vertically movable roof, a venting means for the gas space of the container, and an operating mechanism for said venting means, comprising a prime mover carried by the roof and arranged so that the internal pressure of the container will move said prime mover in a direction to effect the tight seating of said venting means during the upward movement of the roof, and a partial vacuum in the container will move said prime mover in a direction to effect the unseating of said venting means to provide vacuum relief when the roof is in its extreme downwardly deflected condition.

5. A gas and/or liquid storage apparatus, comprising a container provided with a roof that is adapted to move upwardly and downwardly to vary the volume of the gas space of the container, a combined pressure relief and vacuum relief valve carried by the roof, means rendered operative by the upward movement of the roof for opening said valve to provide pressure relief, and a prime mover on said roof constructed so as to be moved relatively to the roof by a partial vacuum created in the gas space, for opening said valve to provide vacuum relief, said prime mover being also constructed so that the pressure in the gas space is exerted on said device in a direction tending to hold said valve tightly seated during a portion of the upward movement of the roof.

6. In a gas and/or liquid storage apparatus, the combination of a container, a vertically movable roof for said container, a mechanism mounted on said roof, comprising a prime mover carried by the roof and adapted to move relatively to the same to open a vent vacuum on said roof when the roof is at rest in its downwardy deflected condition and the container is under an internal vacuum, and a means operated by the vertical movement of the roof for opening a pressure vent when the container is under an internal pressure.

7. In a gas and/or liquid storage apparatus, the combination of a container provided with a vertically movable roof, a combined pressure relief and vacuum relief valve carried by said roof, a diaphragm or equivalent device mounted on the roof and arranged so that an internal pressure in the container causes said diaphragm to flex in one direction and an internal vacuum or minus pressure in the container causes said diaphragm to flex in the opposite direction, and means for transmitting the movements of said diaphragm to said valve.

8. An apparatus of the kind described in claim 7, comprising a part attached to the diaphragm and arranged so that during the upward movement of the roof said part will flex the diaphragm in a direction to open said valve to provide pressure relief for the container.

9. An apparatus of the kind described in claim 7, in which the diaphragm is provided with a depending part arranged inside of the container and adapted to strike a stationary abutment during the upward movement of the roof, to flex said diaphragm in a direction to open said valve to vent the gas space.

10. A gas and/or liquid storage apparatus, comprising a container provided with a vertically movable roof, a vent valve on said roof, a mechanism for operating said valve, and an actuating means for said mechanism consisting of a diaphragm or the like mounted on said roof and arranged so that an internal pressure in the gas space causes said diaphragm to flex in one direction and a partial vacuum in the gas space causes said diaphragm to flex in the opposite direction.

11. An apparatus of the kind described in claim 10, provided with means for utilizing the upward movement of the roof to reverse the position of said diaphragm when said diaphragm is subjected to an internal pressure in the gas space, so as to open said valve to provide pressure relief.

12. A gas and/or liquid storage apparatus, comprising a container provided with a vertically movable roof, a flame arrester on said roof that serves as a passageway for gases which are permitted to escape from the vapor space and for air which is admitted to the vapor space to provide vacuum relief, a vent valve for controlling the escape of gases through said flame arrester and for controlling the admission of air through said flame arrester, and an operating mechanism for said valve, comprising a diaphragm or the like mounted on the roof and provided on its underside with a depending part that coacts with a stationary part on the interior of the container to reverse the position of the diaphragm and thus open the valve to vent the vapor space during the upward movement of the roof.

13. A gas and/or liquid storage apparatus, comprising a container provided with a vertically movable roof, a vent valve for controlling the escape from the container and for controlling the admission of air to the container, and an operating mechanism for said valve, comprising a diaphragm or the like mounted on the roof and provided on its under-side with a depending part that coacts with a stationary part on the interior of the container to reverse the position of the diaphragm and thus open the valve to vent the vapor space during the upward movement of the roof.

14. A gas and/or liquid storage apparatus, comprising a container provided with a roof that is adapted to move upwardly to increase the volume of the gas space of the container, a vent valve for said gas space, a prime mover carried by said roof and constructed so that the internal pressure in the gas space, when said roof is moving upwardly, will cause said prime mover to hold the vent valve seated, and means for causing said vent valve to open automatically to provide pressure relief for the gas space during the upward movement of the roof.

15. A gas and/or liquid storage apparatus, comprising a container provided with a vertically-movable roof, a vent valve, a prime mover carried by the roof and adapted to be operated by the internal pressure of the container for enhancing the seating action of said valve when the container is under a positive pressure and to open said valve to provide vacuum relief when the container is under a certain approximate minus pressure, and means co-operating with said prime mover and rendered operative by the upward movement of the roof for removing, destroying or eliminating the enhanced seating effect produced on the valve by said prime mover, when a certain approximate internal pressure is reached in the container.

16. A venting means for containers that are used to hold liquids, comprising a vent valve, an element separate and distinct from said valve and operated by the internal pressure of the container for enhancing the seating action of said valve so as to prevent said valve from leaking or accidentally opening during a rise in the internal pressure of the container, and a separate and distinct element also operated by the internal pressure of the container for removing or eliminating the enhanced seating action or effect produced on said valve by said first mentioned element, when a certain approximate predetermined positive pressure is reached in the container.

17. An apparatus of the kind described in claim 16, in which the element first mentioned is of considerably greater area than the valve and the second element is of considerably greater area than the first mentioned element.

JOHN H. WIGGINS.